(12) United States Patent
Sharma et al.

(10) Patent No.: US 11,099,659 B2
(45) Date of Patent: Aug. 24, 2021

(54) METHOD AND SYSTEM FOR OPERATING A FLEXIBLE COMPUTING-DEVICE ACCORDING TO DIFFERENT FUNCTIONALITY BASED ON BENDING AXIS

(71) Applicant: SAMSUNG ELECTRONICS CO., LTD., Gyeonggi-do (KR)

(72) Inventors: Ankur Sharma, Uttar Pradesh (IN); Atul Gupta, Uttar Pradesh (IN); Sachin Kumar Gupta, Uttar Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/730,721

(22) Filed: Dec. 30, 2019

(65) Prior Publication Data

US 2020/0133403 A1    Apr. 30, 2020

Related U.S. Application Data

(63) Continuation of application No. 15/983,270, filed on May 18, 2018, now abandoned.

(30) Foreign Application Priority Data

May 23, 2017    (IN) .............................. 201711018053

(51) Int. Cl.
*G06F 3/0338* (2013.01)
*G06F 3/0482* (2013.01)
(Continued)

(52) U.S. Cl.
CPC .......... *G06F 3/0338* (2013.01); *G06F 1/1626* (2013.01); *G06F 1/1652* (2013.01);
(Continued)

(58) Field of Classification Search
CPC .... G06F 3/0338; G06F 3/0482; G06F 3/0488;
G06F 3/04886; G06F 3/041;
(Continued)

(56) References Cited

U.S. PATENT DOCUMENTS 7,880,718 B2    2/2011    Cradick et al.
8,928,619 B1    1/2015    Cho
(Continued)

FOREIGN PATENT DOCUMENTS

EP    2693319 A2    2/2014
EP    3065025 A1    1/2016
(Continued)

OTHER PUBLICATIONS

Extended European Search Report issued in corresponding European Patent Application No. 18805077 dated Dec. 16, 2019.
(Continued)

*Primary Examiner* — Ryan A Lubit
(74) *Attorney, Agent, or Firm* — Sughrue Mion, PLLC

(57) ABSTRACT

A method and a system for operating a flexible computing-device is provided. The method is executed by the system and includes determining at least one bending axis of a computing-device based on a type of application selected by a user. Based on an activation-instruction received from the user, a bending-axis selected from one or more bending axis is also activated. Further, at least one user-input directed to the device is received, based upon which a user-interface of the application uniquely linked to the activated bending-axis is rendered. Such user-interface has at least one designated-control to operate the application.

18 Claims, 13 Drawing Sheets

(51) Int. Cl.
*G06F 3/0488* (2013.01)
*G06F 3/041* (2006.01)
*G06F 1/16* (2006.01)

(52) U.S. Cl.
CPC ............ *G06F 1/1694* (2013.01); *G06F 3/041* (2013.01); *G06F 3/0482* (2013.01); *G06F 3/0488* (2013.01); *G06F 3/04883* (2013.01); *G06F 3/04886* (2013.01); *G06F 2203/04102* (2013.01); *G06F 2203/04803* (2013.01); *G06F 2203/04806* (2013.01)

(58) Field of Classification Search
CPC .. G06F 3/04883; G06F 3/0481; G06F 3/1423; G06F 1/1626; G06F 1/1694; G06F 1/1652; G06F 2203/04806; G06F 2203/04803; G06F 2203/04102
See application file for complete search history.

(56) References Cited

U.S. PATENT DOCUMENTS

| | | | |
|---|---|---|---|
| 9,268,368 B2 | 2/2016 | Kang et al. | |
| 2011/0227822 A1* | 9/2011 | Shai | G06F 1/1641 345/156 |
| 2013/0179781 A1* | 7/2013 | Nan | G06F 3/04812 715/711 |
| 2013/0265262 A1* | 10/2013 | Jung | G06F 3/017 345/173 |
| 2013/0300682 A1* | 11/2013 | Choi | G06F 3/0482 345/173 |
| 2013/0300686 A1* | 11/2013 | Yoon | G06F 3/04842 345/173 |
| 2014/0015743 A1* | 1/2014 | Seo | G06F 3/04845 345/156 |
| 2014/0028596 A1* | 1/2014 | Seo | G06F 3/0487 345/173 |
| 2014/0028597 A1* | 1/2014 | Cho | G06F 3/04842 345/173 |
| 2014/0049464 A1* | 2/2014 | Kwak | G06F 1/1652 345/156 |
| 2014/0071043 A1* | 3/2014 | Jung | G06F 3/03 345/156 |
| 2014/0101560 A1 | 4/2014 | Kwak et al. | |
| 2014/0210706 A1 | 7/2014 | Park et al. | |
| 2014/0285449 A1* | 9/2014 | Cho | G06F 3/0416 345/173 |
| 2015/0227225 A1* | 8/2015 | Park | G06F 1/1641 345/173 |
| 2015/0355728 A1* | 12/2015 | Cho | G06F 3/04886 345/173 |
| 2016/0026327 A1* | 1/2016 | Park | G06F 3/03545 345/173 |
| 2016/0216822 A1 | 7/2016 | Jang | |
| 2016/0274676 A1 | 9/2016 | Jung et al. | |
| 2016/0283086 A1 | 9/2016 | Inagaki et al. | |
| 2017/0045996 A1 | 2/2017 | Ka et al. | |
| 2017/0078468 A1* | 3/2017 | Cho | H04M 1/0268 |
| 2017/0358252 A1* | 12/2017 | Bhageria | G06F 3/013 |

FOREIGN PATENT DOCUMENTS

| | | |
|---|---|---|
| KR | 10-2011-0133861 A | 12/2011 |
| KR | 10-2015-0125554 A | 11/2015 |

OTHER PUBLICATIONS

International Search Report (PCT/ISA/210) dated Jul. 31, 2018 issued by the International Searching Authority in International Application No. PCT/KR2018/005157.

Written Opinion (PCT/ISA/237) dated Jul. 31, 2018 issued by the International Searching Authority in International Application No. PCT/KR2018/005157.

* cited by examiner

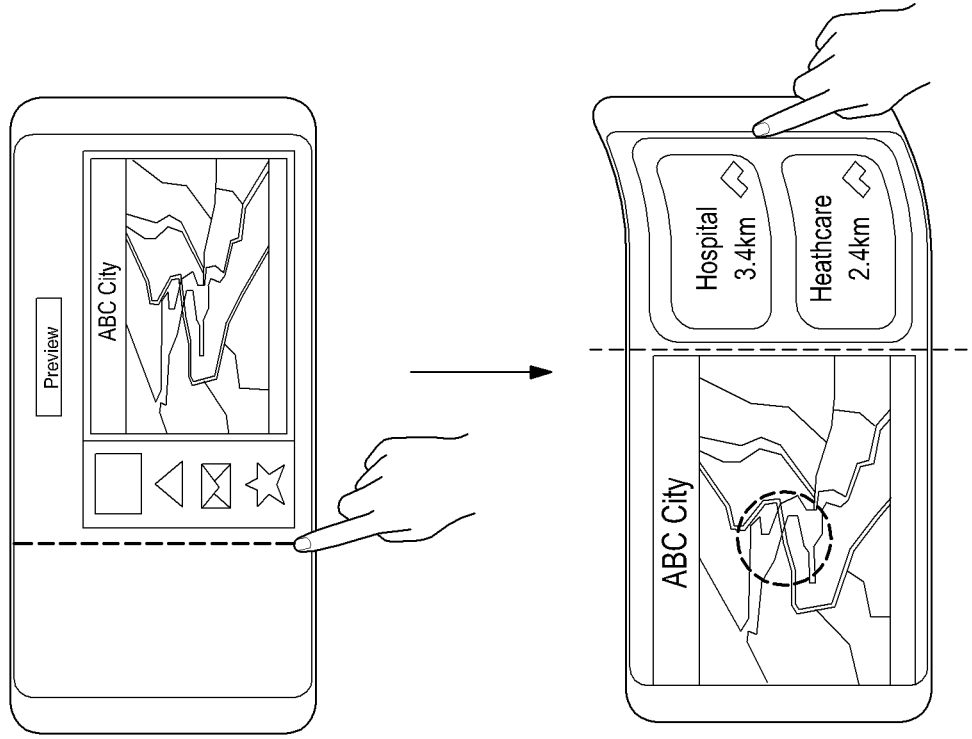
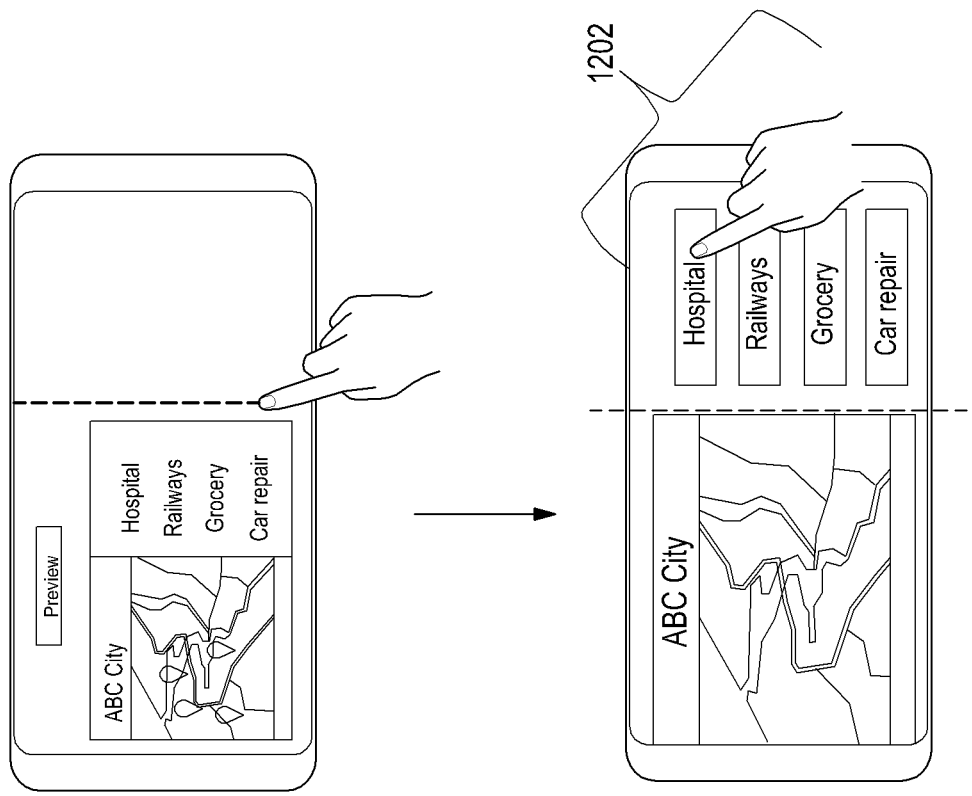

METHOD AND SYSTEM FOR OPERATING A FLEXIBLE COMPUTING-DEVICE ACCORDING TO DIFFERENT FUNCTIONALITY BASED ON BENDING AXIS

CROSS-REFERENCE TO RELATED APPLICATION(S)

This is a Continuation of U.S. application Ser. No. 15/983,270, filed May 18, 2018, which is based on and claims priority under 35 U.S.C. § 119 to Indian Patent Application No. 201711018053, filed on May 23, 2017, in the Indian Patent Office, the disclosure of which is incorporated herein by reference in its entirety.

BACKGROUND

1. Field

The disclosure broadly relates to a computing device, and in particular, the disclosure relates to enhancing operation and access of functions within the computing device.

2. Description of Related Art

With the advancement in technology, we are moving towards usage of devices with flexible display property, where the screen size can be bent flexibly along various axes. As a result, a user can now have much more options of operating the device, by virtue of using the bending based property of the display screen as a trigger to perform various operations. The user can bend the display screen at fixed positions and the system displays the menu items as per the available display area.

The known solutions treat the bending property as a specific type of input gesture and thus provide the output corresponding to the read input gesture. Some other solutions work on redesigning the user interface of the bend portion like displaying multiple applications or treating it as multiple partitions. However, such existing solutions are able to extract only limited functionality out of the bending property of the devices in a limited manner, thereby rendering the bending based input as largely under-utilized. Alternatively, despite having a provision of the computing device being flexible in nature, the additional functionalities that may be exclusively attributed to such a flexible nature of the device are limited in nature, thereby rendering the "bendable computing devices" as being almost equivalent to the existing computing devices in terms of ease of operation.

Accordingly, there lies a need to enhance a user-experience of interacting with the device application functions, using the bendable device technology.

There lies another need to control the bending of the display device in order to achieve a customized user-interface with respect to any given application-function.

The above information is presented as background information only to assist with an understanding of the disclosure. No determination has been made, and no assertion is made, as to whether any of the above might be applicable as prior art with regard to the disclosure.

SUMMARY

This summary is provided to introduce a selection of concepts in a simplified format that are further described in the detailed description of exemplary embodiments. This summary is not intended to identify key or essential inventive concepts of the disclosure, nor is it intended for determining the scope of the invention.

In accordance with an aspect of the embodiment, a method and system for operating a flexible computing-device is provided. The method as executed by the system and includes determining at least one bending axis of a computing-device based on at least a type of an application selected by a user of the computing device. Based on an activation-instruction received from the user, a bending-axis selected from the bending axis is activated. Further, at least one user-input directed to the device is received, based upon which a user-interface of the application uniquely linked to the activated bending-axis is rendered. Such user-interface has at least one designated-control to operate on the application.

According to an aspect of an embodiment, the applications in a computing device maintain multiple output patterns within the same device for the same set of known gesture inputs. The user is allowed to choose a specific pattern of the desired output from the selected application, by virtue of controlling the bendability of the bend axis in the display screen device. More specifically, the core-functionalities of the application are dispersed across multiple design-patterns, which in turn are mapped to the selected bend axis and further to a particular access-level. According to an aspect of an embodiment, the user chooses core functions to be mapped to a particular bend axis.

To further clarify aspects of one or more embodiments, a more particular description will be rendered by reference to specific embodiments thereof, which is illustrated in the appended drawings. It is appreciated that these drawings depict only typical embodiments and are therefore not to be considered limiting of its scope. The disclosure will be described and explained with additional specificity and detail with the accompanying drawings.

BRIEF DESCRIPTION OF THE DRAWINGS

These and other features, aspects, and advantages of embodiments will become better understood and more apparent from the following detailed description taken in conjunction with the accompanying drawings, in which:

FIGS. 12A and 12B are views illustrating yet another implementation according to an embodiment.

Figure 1:
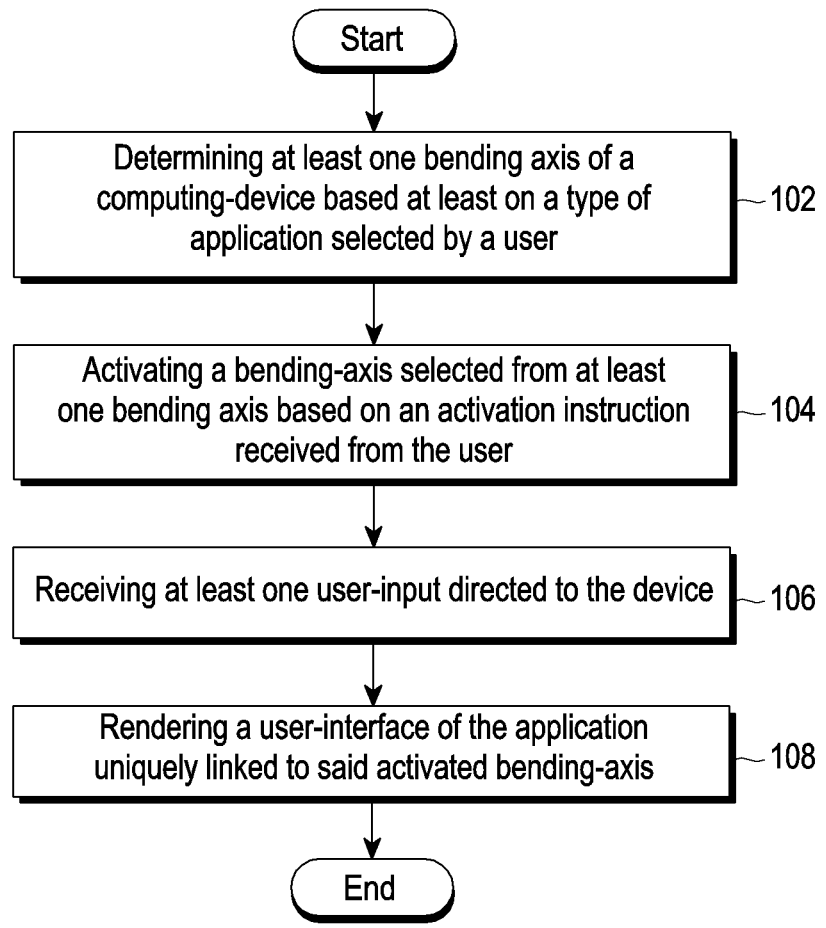
FIG. 1 is a flow diagram illustrating a method according to an embodiment.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of embodiments of the disclosure. Furthermore, in terms of the construction of the device, one or more components of the device may have been represented in the drawings by conventional symbols, and the drawings may show only those specific details that are pertinent to understanding embodiments of the disclosure so as not to obscure the drawings with details that will be readily apparent to those of ordinary skill in the art having benefit of the description herein. Same numeric references depicted in various drawings may represent analogous elements in embodiments.

DETAILED DESCRIPTION OF EXEMPLARY EMBODIMENTS

For the purpose of promoting an understanding of the principles of the disclosure, reference will now be made to embodiments illustrated in the drawings and specific language will be used to describe the same. It will nevertheless be understood that no limitation of the scope of the disclosure is thereby intended, such alterations and further modifications in the illustrated system, and such further applications of the principles of an inventive concept as illustrated therein being contemplated as would normally occur to one skilled in the art to which the inventive concept relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with an embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the disclosure will be described below in detail with reference to the accompanying drawings.

Now referring to FIG. 1, in accordance with an embodiment, a method of operating a flexible computing-device is provided. The method comprises determining (in operation 102) at least one bending axis of a computing-device based at least on a type of application selected by a user within the computing device. Such determination may be based on location of the user-selected application within a display-screen of the computing device, where such location is at least one of a default location of the application, and a newly attained location of the application, the location having been attained after sending a recommendation to the user. In an example, the user may be prompted to change the location of the selected application within the display-screen at a particular location so as to leave enough space for rendering a number of bending-axes within the display-screen.

The method further comprises receiving a user-selection of the one or more bending-axis. Thereafter, a layout corresponding to a user-interface of the selected application and uniquely linked to the corresponding bending-axis is displayed to facilitate the user at evaluating the one or more bending axis. The layout corresponding to the user-interface may be a preconfigured arrangement of control-options as a part of automated-settings (e.g. based on artificial intelligence). For example, a computing system may note most preferred ways a user deals with an application. Accordingly, such preferred ways or selectable options may be ranked higher while rendering the layout. Likewise, taking into account the concept of internet of things (IOT), the most necessary/urgent control-options with respect to an operation of electrical appliances/electricity at home may be ranked higher within the layout. For example, a power on/off control option for switching off the main switch of a house may be exhibited as a highly ranked graphical control option within the layout, in case the application as selected is meant for controlling electricity at home.

In another example, the layout may be an arrangement of control-options customized by the user as part of a configuration of settings of the computing-device. Overall, the layout corresponding to each bending axis represents sub-user interfaces of the overall user-interface.

According to an embodiment, the method may further comprise activating (in operation 104) a bending-axis selected from at least one bending axis based on an activation-instruction received from the user. Such activation of the selected bending axis comprises automatically deactivating the remaining bending axes of the device in order to restrict the bending of the computing-device only about the activated bending-axis.

The method further comprises receiving (in operation 106) at least one user-input directed to the computing device, where such user-input is either a touch-gesture over the computing-device or an application of pressure about the activated bending-axis to bend the computing-device thereon. Such user-input corresponds to a particular level of actuation of the user-interface for rendering one or more designated controls corresponding to the particular level. For example, a pressure applied by a certain amount to the computing device corresponds to a particular level out of the three designated levels, by way of an example.

The method further comprises rendering (in operation 108) a user-interface of the application uniquely linked to the activated bending-axis, the user-interface having at least one designated-control to operate upon the application. As may be understood such user-interface may be a portion or sub-set of the main user-interface associated with the selected application. Accordingly, such user-interface may be configured to receive another user-input to operate upon the rendered user-interface. As a result, one or more functionalities of the applications are realized by the user based on the provided user-input.

Figure 2:
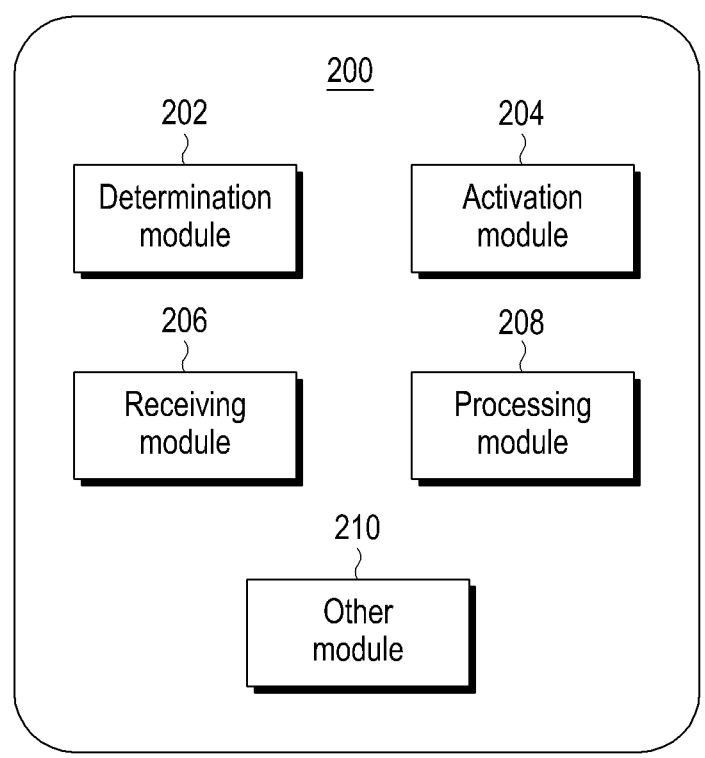
FIG. 2 is a block diagram illustrating a detailed internal-construction of the system according to an embodiment.

FIG. 2 is a block diagram illustrating a detailed internal construction of a system 200 in according to an embodiment. The system 200 includes a determination module 202 that performs, for example, an operation 102, an activation-module 204 that performs, for example, an operation 104, a receiving module 206 that performs, for example, an operation 106 and a processing module 208 that performs, for example, an operation 108. Likewise, there may be other modules 210 within the system 200 that facilitate the operational interconnection among the modules 202 till 208, and perform other ancillary-functions. One of ordinary skill on the art will readily appreciate that each of the foregoing modules may be implemented through software, hardware and/or a combination thereof.

Figure 3:
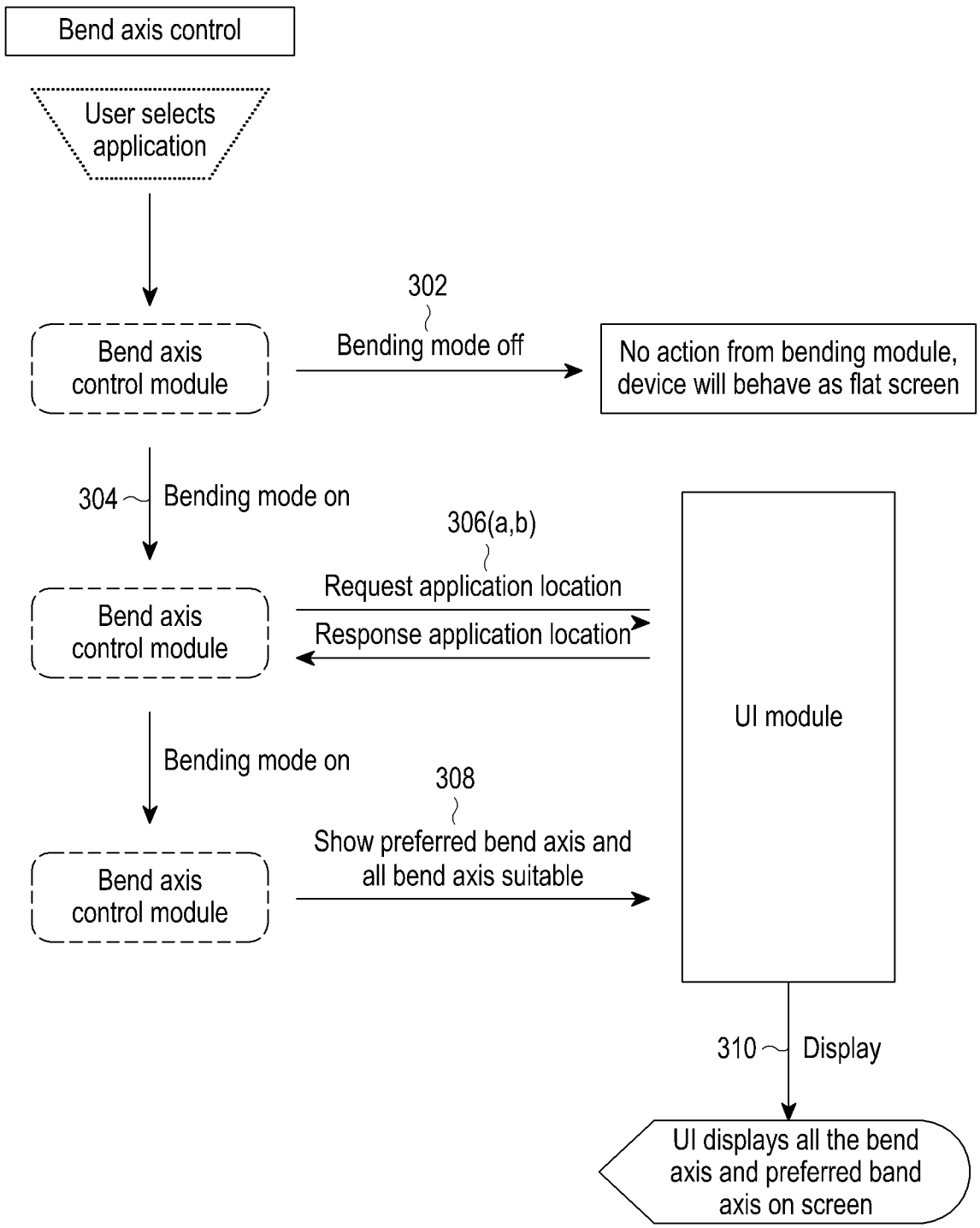
FIG. 3 is a flow chart illustrating a control-flow according to an embodiment.

FIG. 3 is a flow chart illustrating an implementation of determining at least one bending axis of a computing-device such as the operation 102 of FIG. 1, described above.

In operation 302, the user can turn off a 'BEND-MODE' feature in the device. As may be understood, the turning off of the 'BEND-MODE' restricts the bending of the computing device at any zone, despite the computing-device being capable of being 'bent'.

In operation 304, the user activates 'BEND MODE' feature to enable a 'bend axis control-module' to control the bending of the computing device at various 'Bend Zones'.

In operation 306, the location of a selected application (as selected by the user) is requested by 'a bend-axis control module' from a user-interface module of the computing device. Such location may be based on the current location of the application (e.g. location of a gallery icon) within the display screen. More specifically, operation 306a denotes the bend-axis control module requesting the user-interface (UI) module to provide a current location, and in operation 306b denotes the response emanating from the UI module and intended for the bend axis control module. The response in operation 306b includes the graphical coordinates of the current location of the application.

In operation 308, the available bend axes/bend-zones are forwarded by the control module to the UI module for causing a display thereof.

In operation 310, the available bend axes/bend-zones are displayed to the user. At the same time, the UI module prompts the user to move the selected application icon to a preferred bend location in order to provide 'maximum' bend-axes which could be associated with the selected application.

Accordingly, the bending control module, upon receiving a new location of the displaced application, further updates the number of bending axes as displayed on-screen. One of ordinary skill in the art will readily appreciate that each of the foregoing modules may be implemented through software, hardware and/or a combination thereof.

Figure 4:
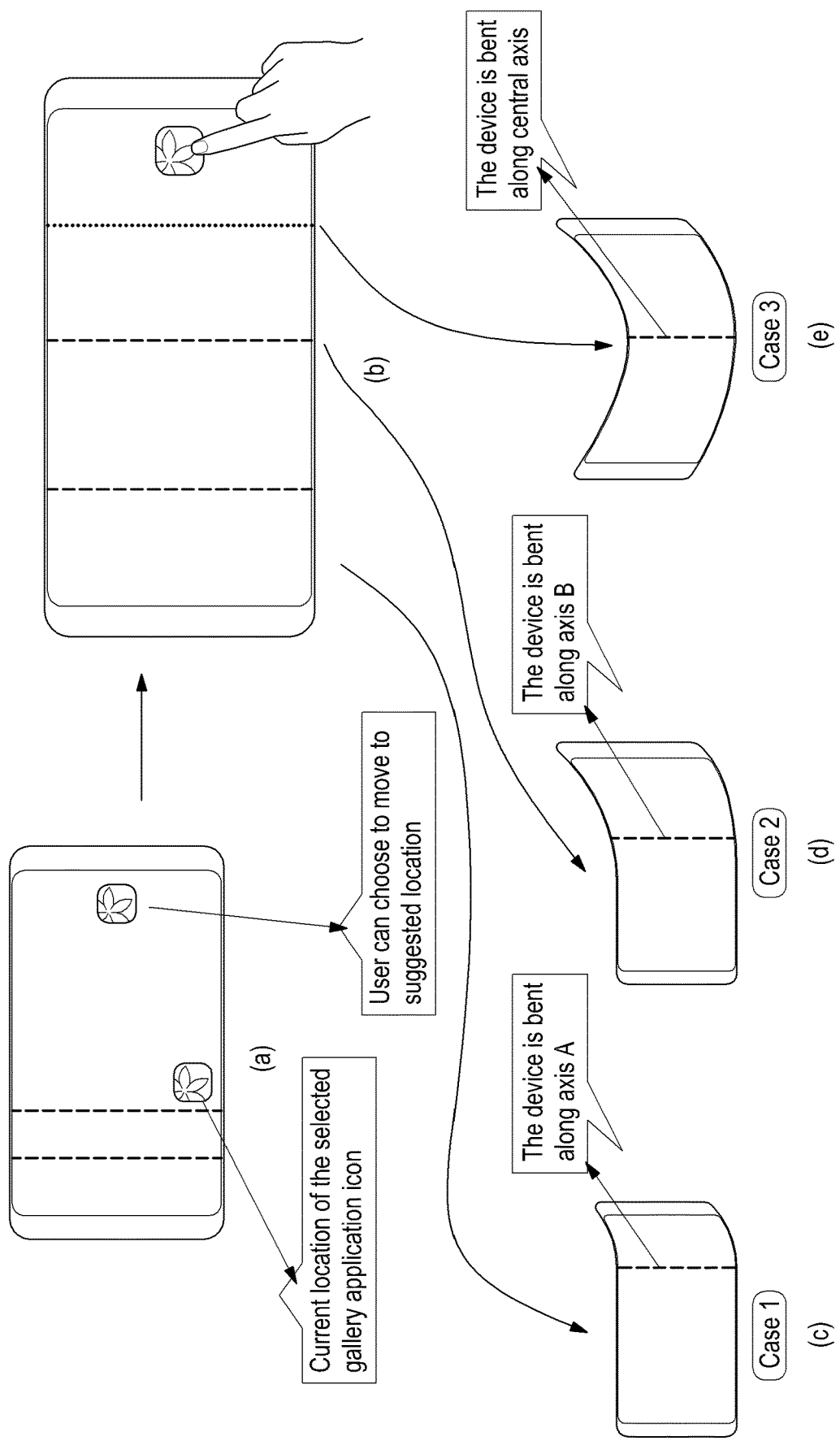
FIG. 4 is a view illustrating an implementation of a control flow according to an embodiment.

FIG. 4 is a view illustrating a visual representation of an implementation of a control flow such as the one described in FIG. 3, according to an embodiment. In FIG. 4, (a) depicts the operation 310 in terms of displaying the bending axis with respect to the selected application and simultaneously prompting the user to displace the selected application icon to a new location. In FIG. 4, (b) depicts the displaced location of the application icon and a resultant high number of bending-axis as compared to (a) as shown in FIG. 4, according to an embodiment of the disclosure.

In FIG. 4, (c), (d), and (e) depict how the computing device may be bent about different bending-axes (e.g. 3 in number) as depicted in (b) as shown in FIG. 4. The device can be bent about these vertical bend axes, upon having been subjected to the pressure as applied by the user. The device when subjected to the applied pressure by user on the display screen will bend about any of these bend axes only. Further, through activation and deactivation, the bending ability of these bend zones/axis may be controlled based on user preferences. If the axis/zone is 'deactivated', the device will not bend about that axis.

Figure 5:
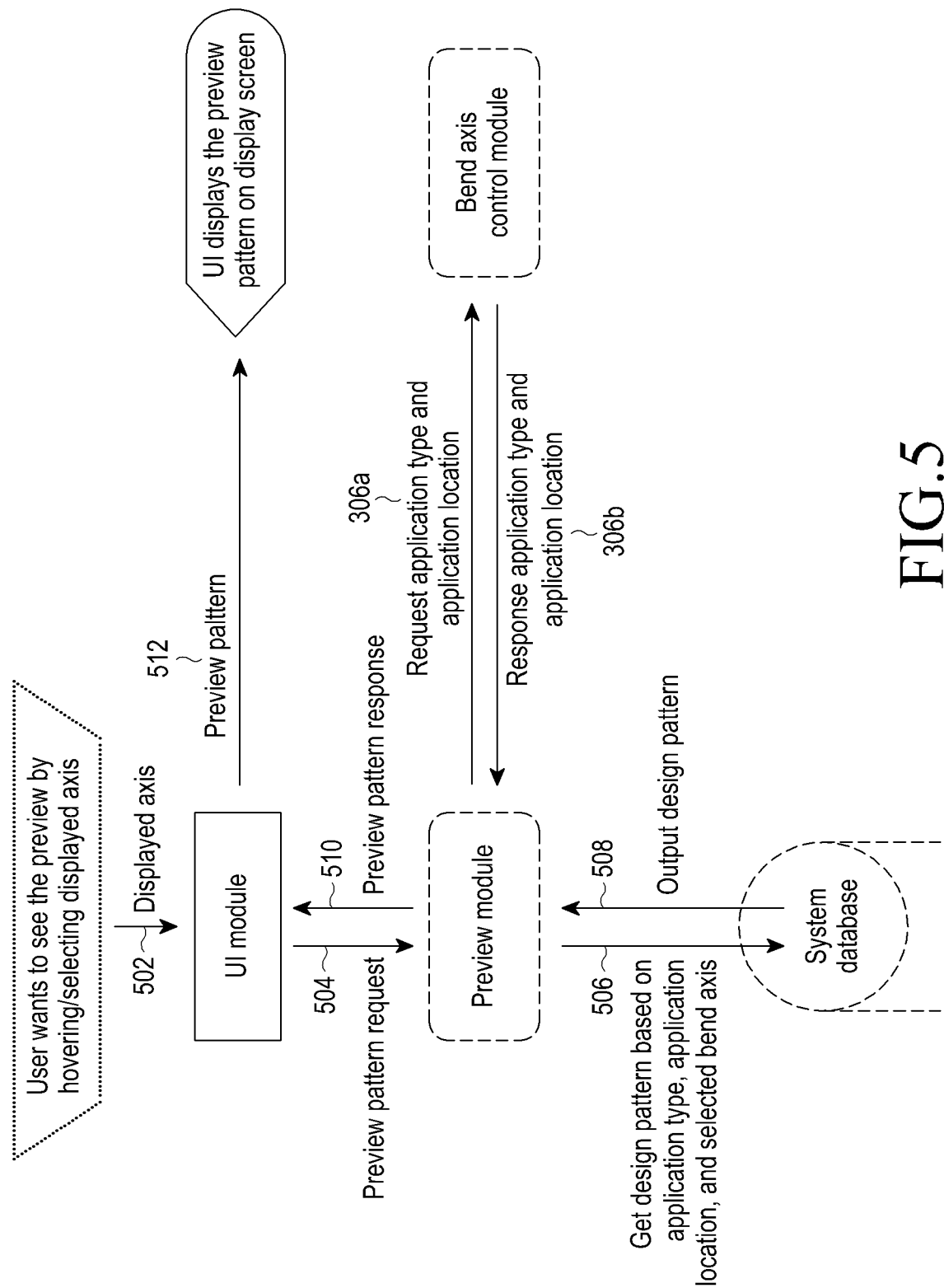
FIG. 5 is a flow chart illustrating another control-flow according to an embodiment.

FIG. 5 is a flow chart illustrating an implementation of another control-flow according to an embodiment of the disclosure such as method operations of FIG. 1. More specifically, FIG. 5 is a flow chart illustrating operations executed by the device at a backend for the rendering of a preview of the layouts or user-interfaces with respect to the different bending axes as have been shown to the user with respect to the selected application.

Operation 502 represents a user-selection of the displayed bend axis to have a 'preview' of the type of display which is associated with the application functionality mode for the selected axis. Such selection of any one of the displayed bend axis may be accomplished by simply hovering the mouser-cursor over the designated bend axis.

Operation 504 represents forwarding of the request in operation 502 by the user interface module to a 'preview-module'.

Operation 506 represents the 'preview-module' submitting a request to a computing-device database for seeking a preview of the layout as associated with the selected bending axis. Alongside, the 'preview-module' through the operation 306a, b (similar to what is depicted in FIG. 3) extracts the nature and location of the currently selected application.

Operation 508 represents receiving of an output-pattern or a layout by the 'preview-module' from the computing-system database such as an external memory or a server which stores various output design patterns corresponding to various application types, application locations, and various bend axis.

Operation 510 represents the receipt of a 'layout' and an application location information by the UI from the preview module.

Operation 512 represents rendering of the 'preview' by the user-interface module, with respect to the selected bend axis.

Figure 6C:
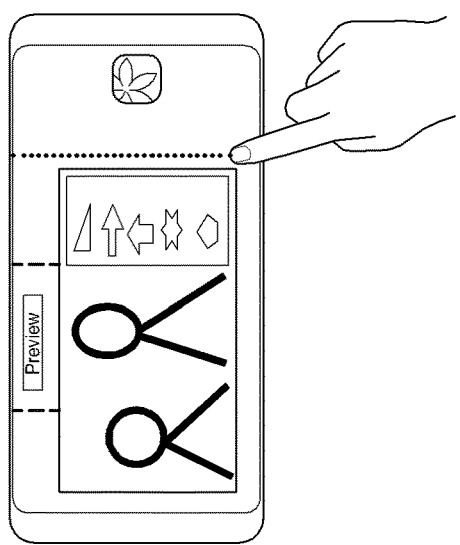
FIGS. 6A-6C are views illustrating implementations of the another control-flow according to an embodiment.
Figure 6B:
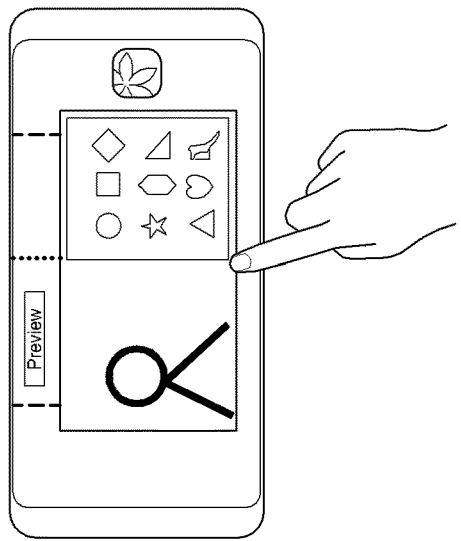
Figure 6A:
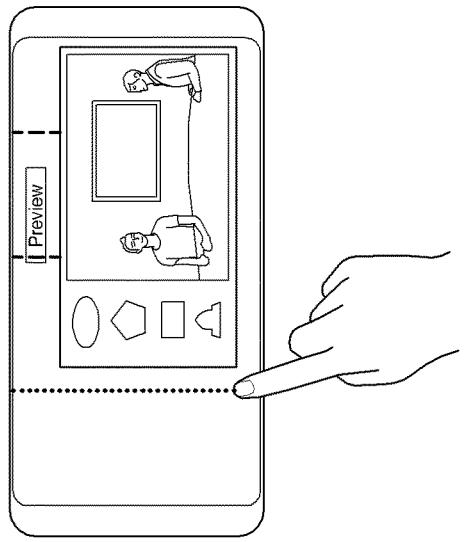

FIGS. 6A-6C are views illustrating visual representations of a control flow according to an embodiment of the disclosure such as the one described above with reference to FIG. 5. FIGS. 6A-6C depict the preview or the layout with respect to each 'bend-axis' as otherwise depicted in FIG. 4(b). As may be seen from FIGS. 6A-6C, each layout is associated with a particular bend-axis and corresponds to a particular sub-user interface with respect to the selected application. The displayed image with respect to each layout indicates a characteristic of the user-interface.

Figure 7:
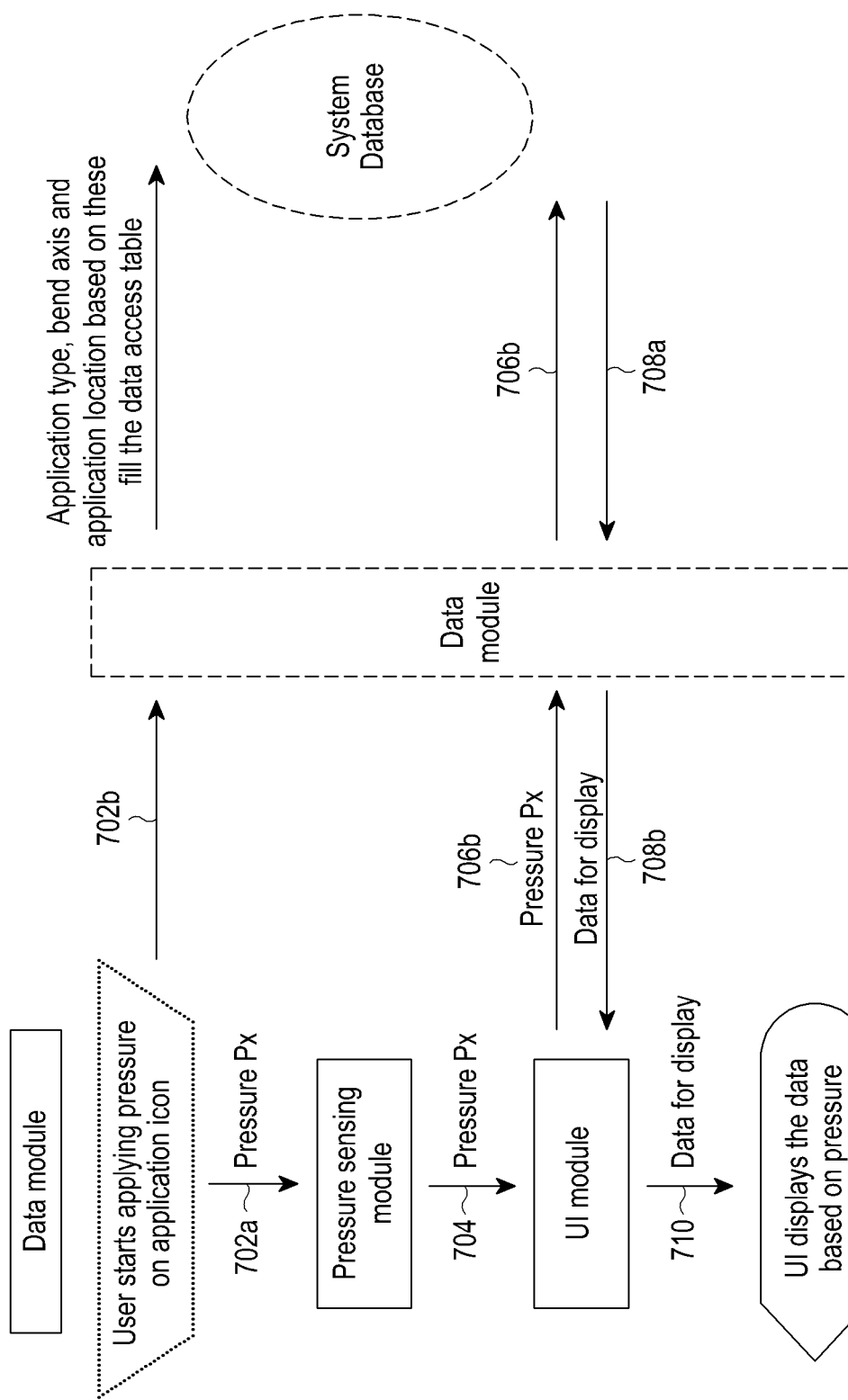
FIG. 7 is a flow chart illustrating another control-flow according to an embodiment.

FIG. 7 is a flow chart illustrating an implementation of a method such as method operations of FIG. 1 according to an embodiment of the disclosure. More specifically, FIG. 7 represents a particular implementation of receiving user-input directed to the device and rendering a UI of the application uniquely linked to the activated bending-axis according to an embodiment of the disclosure such as operations 106 and 108 of FIG. 1. For example, FIG. 7 is a view illustrating a scenario of a particular bend-axis (one out of the ones shown in (b) in FIG. 4 by way of an example) has been activated by the user (as illustrated in operation 104 of FIG. 1) for further operation through operation 108 of FIG. 1.

In operation 702a, the user applies an input against the application icon displayed on the screen. In an example, the user-input against the application icon may be a pressure application that attempts to bend the device only about the activated bend-axis.

In operation 702b, the pressure-application is forwarded to a data module of the computing device to prepare a complete set of data that may be applicable against the current bending-axis. In an example, such data is prepared in the form of a data table.

In operation 704, a pressure-sensing module senses the applied pressure as a part of the user-input and numerically evaluates the same.

In operation 706(a, b), a numerical-equivalent value of the applied pressure Px is then forwarded to a database of the computing-device via the data module to shortlist a subset of data from data accumulated in operation 702b. More specifically, the numerical figure associated with the pressure is used as a basis to shortlist the data based on the pressure value. Accordingly, differently applied pressure values correspond to different access-levels and accordingly different types of data being displayed.

In operation 708(a, b), the shortlisted data is received by the user-interface (UI) module from the database of the computing-device via the data-module.

In operation 710, the shortlisted data as received in operation 708(a, b), is rendered by the UI module for a display against the activated bend-axis.

Figure 8A:
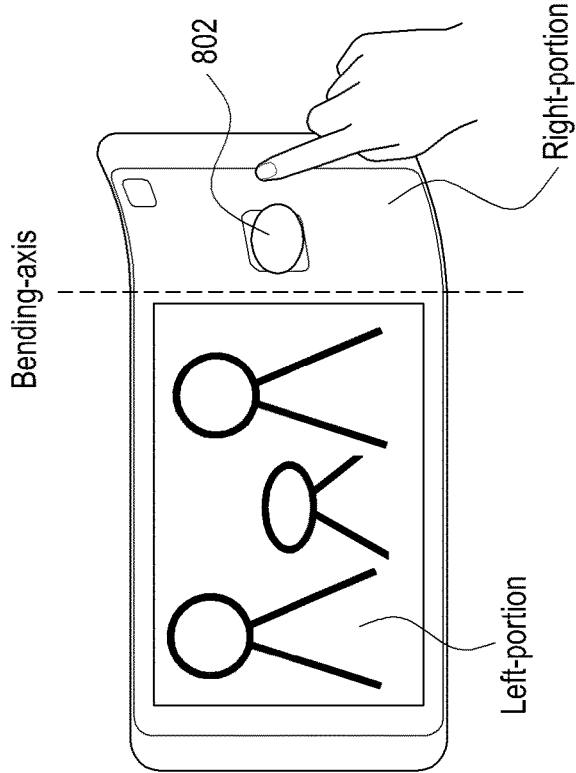
FIGS. 8A-8C are views illustrating yet another implementation of the another control-flow according to an embodiment.
Figure 8B:
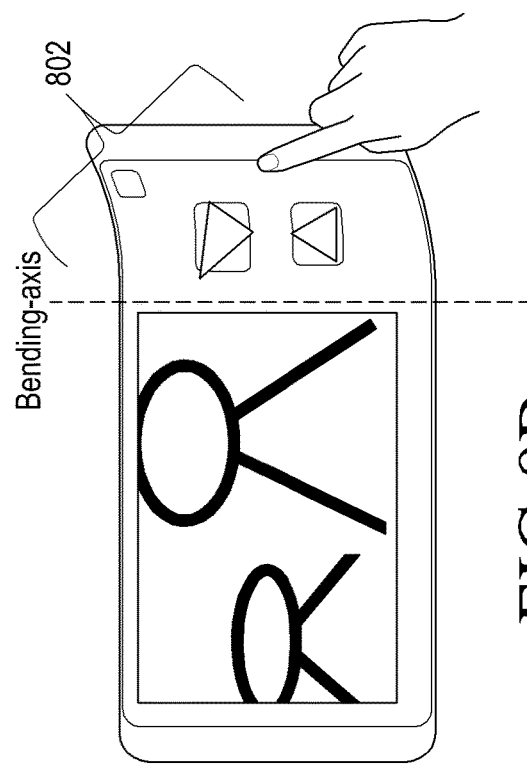
Figure 8C:
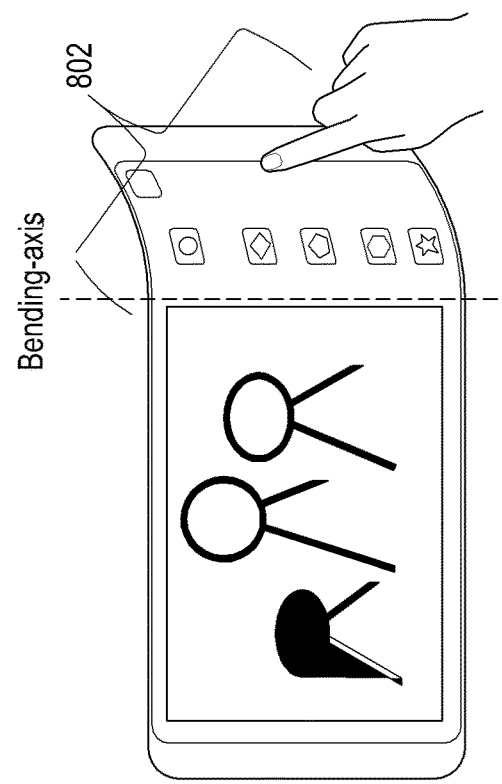

FIGS. 8A-C are views illustrating an exemplary visual representation of a method according to an embodiment of the disclosure such as the one described above with reference to FIG. 7. FIGS. 8A-8C, each correspond to a differently applied pressure-level and accordingly represent the display of shortlisted data with respect to a different pressure-level or a bending level. As a user keeps bending the device by different pressure levels, the same leads to a depiction of fresh control-options 802 at the right-hand side portion of the activated bending axis. Accordingly, any one of the control-options may be selected by the user to achieve a utility of the selected application.

In an example of FIGS. 8A-8C, in case of the application being a photo-gallery, the left hand side portion depicts the image and the right hand side portion depicts the image-category it relates to, as well as other image categories in the form of control-options 802. Accordingly, any of the control-options 802 may be selected to depict a first image in that category. Thereafter, the right hand side portions may also be actuated (through a control-option) to browse other images in the category as is currently being selected as the control-option 802.

Figure 9:
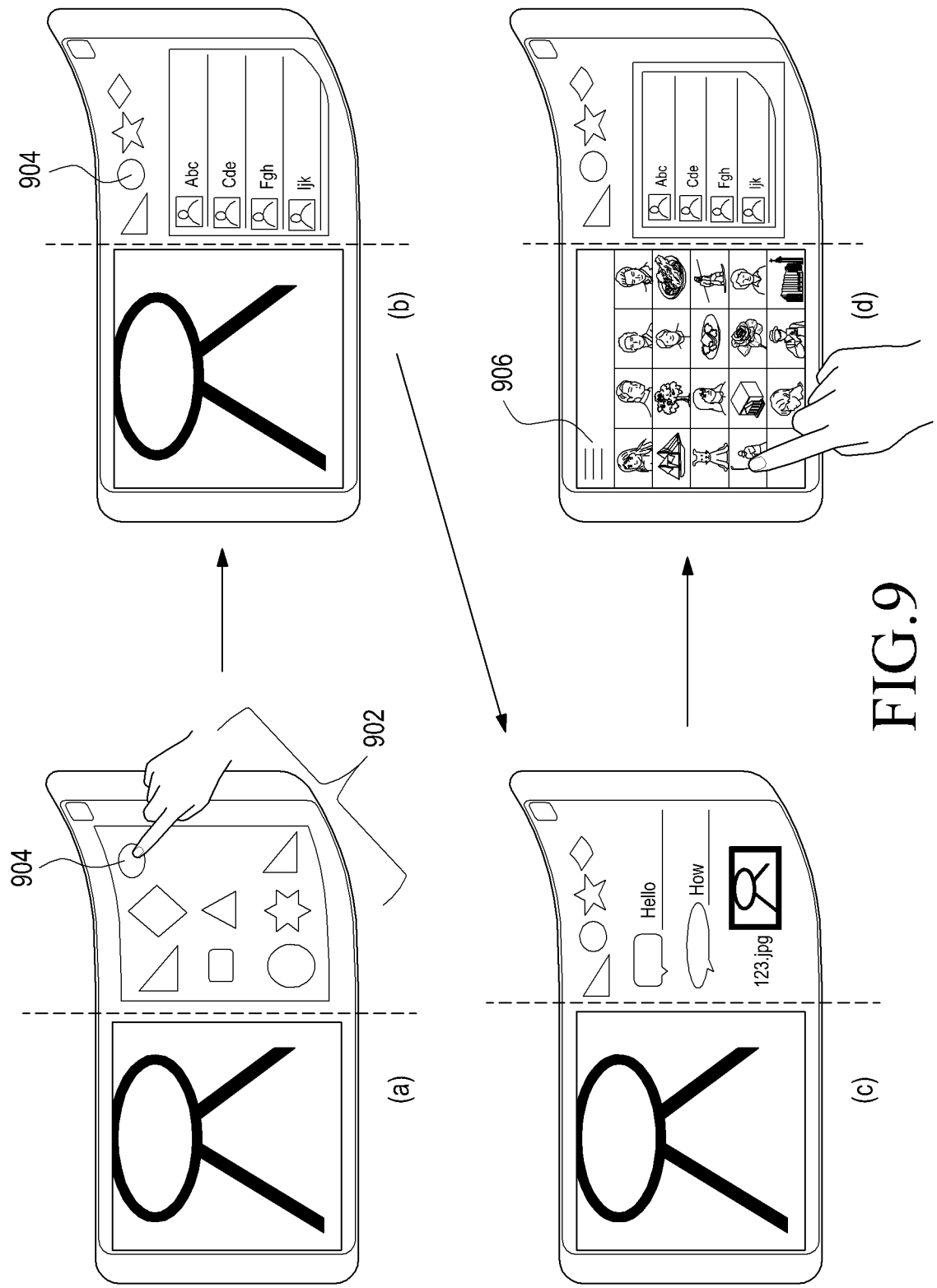
FIG. 9 is a view illustrating yet another implementation according to an embodiment.

FIG. 9 depicts an exemplary implementation of the present invention. In FIG. 9, a galley application has been selected and a particular bend-axis has been activated so as to enable sharing of the gallery images. Thereafter, the selected application icon upon being subjected to a pressure-application by a pre-determined level leads to the display as represented in (a) as shown in FIG. 9.

As shown in (a) in FIG. 9, a particular pressure level application leads to the display of (b) as shown in FIG. 9. The user can then choose to select an application which he wants to use for sharing the displayed image from the list of applications 902. Accordingly, an application 904 may be chosen.

As shown in (b) in FIG. 9, the user is displayed in the launched application 904 at the right hand side portion, where he can choose a contact with which to share the displayed image.

As shown in (c) in FIG. 9, the image is shared instantaneously with the contact according to an embodiment.

If the user now wishes to send more images from the images extracted for the bending, he or she can choose to select a menu option. As shown in (d) in FIG. 9, all the images 906 extracted according to the currently prevalent 'bending-level' are displayed to the user. The user can select another image and share it with another contact. The user can even switch over to a new control option in the list 902 in order to share the image through a different control option.

Figure 10:
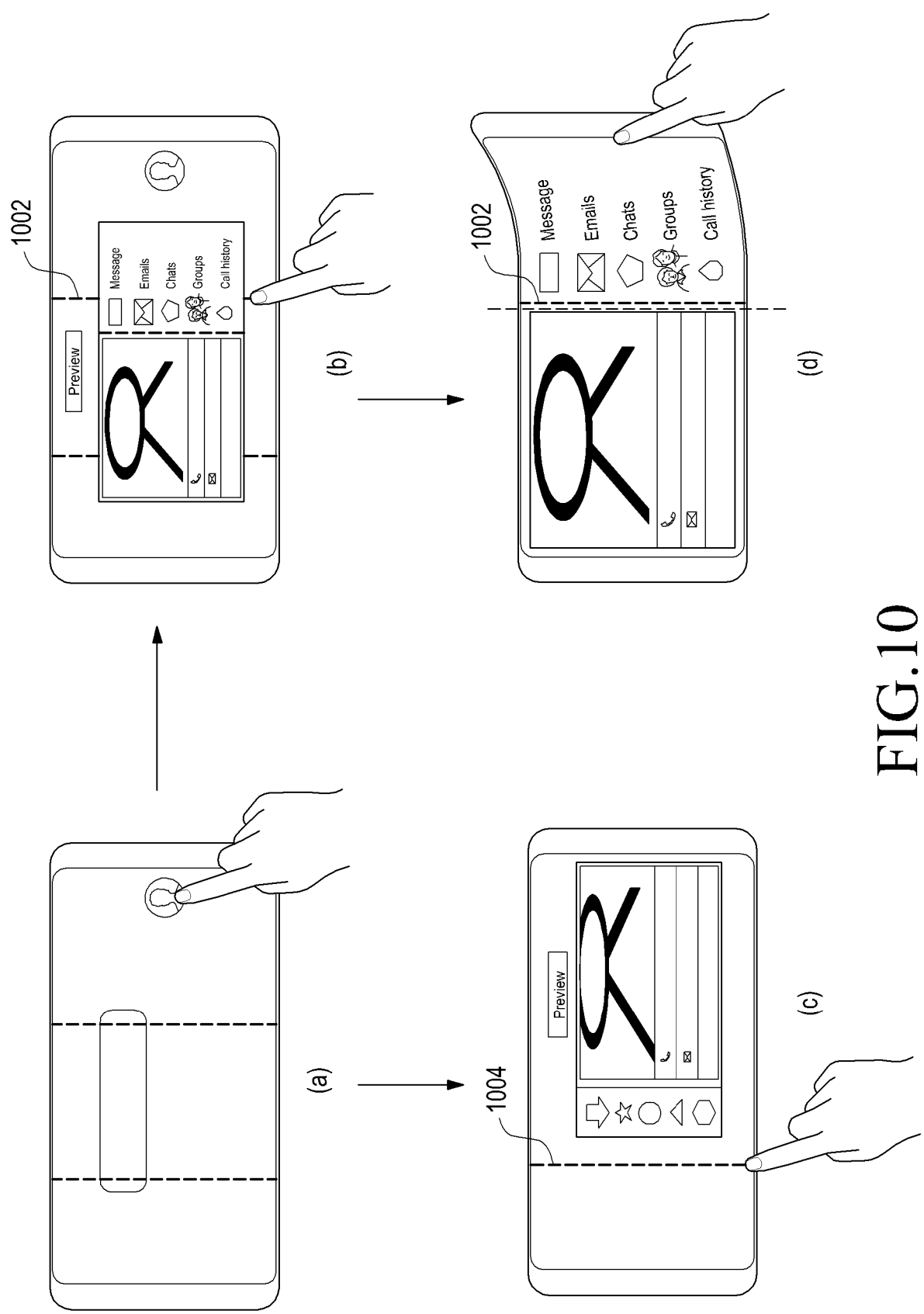
FIG. 10 is a view illustrating yet another implementation according to an embodiment.

FIG. 10 is a view illustrating another implementation of an embodiment in which a 'contact-member' based application has been selected.

As shown in (a) in FIG. 10, the applicable bend-axes (e.g. '2' in number) have been shown in (b) and (c) FIG. 10 illustrate the preview of 'contact-member' application with respect to two different axes 1002, 1004, respectively. While (b) as shown in FIG. 10 depicts control options to extract a log of communication (as have happened) with respect to the one or more contacts in the list, (c) as shown in FIG. 10 depicts various control-options 1004 to establish different types of communication (e.g. phone call, message, video call) with any contact-member.

Accordingly, (d) as shown in FIG. 10 depicts activation of the bending axis corresponding to the preview in (b) as shown in FIG. 10 to perform further operations. The representation shown in (d) in FIG. 10 is displayed in response to detecting a particular-level pressure application against the 'contact-member' application icon, so as to render the left and right hand side portions separated by the activated bend axis, as depicted in (b) in FIG. 10. Accordingly, the user can now select any control-option at the right-hand side portion and check communication log with respect to the contact currently under consideration. Any other contact may also be chosen from the menu at the left hand side, similar to the action depicted with respect to (d) as shown in FIG. 9.

Figure 11B:
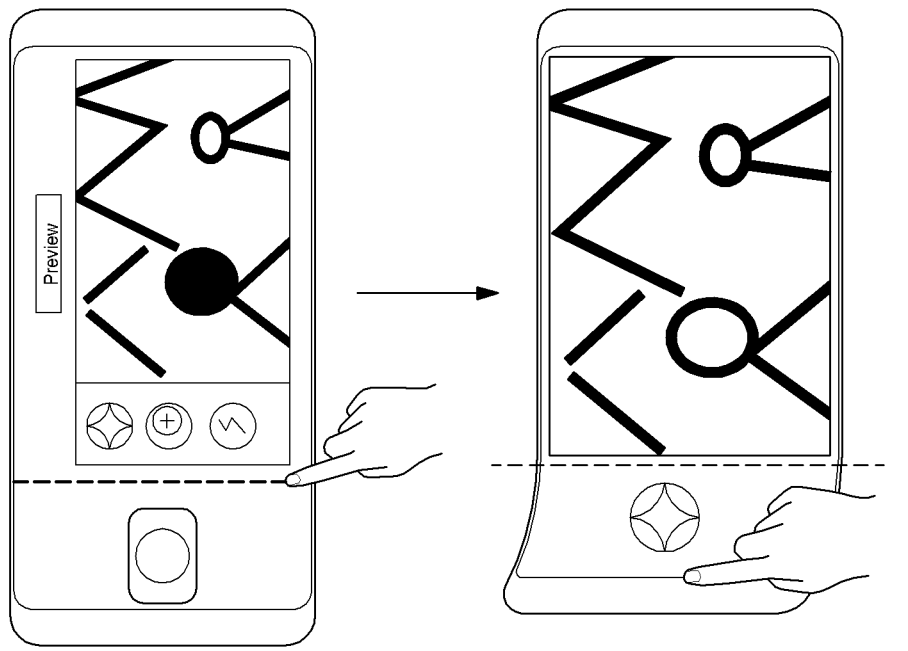
FIGS. 11A and 11B are views illustrating yet another implementation according to an embodiment.
Figure 11A:
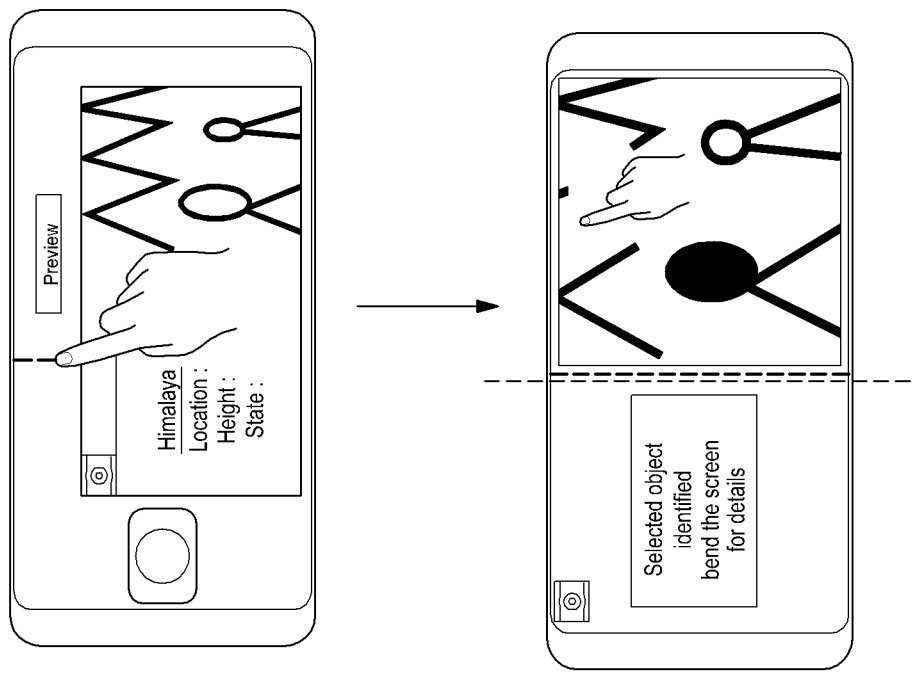

FIGS. 11A and 11B are views illustrating another implementation of an embodiment in which a 'camera' application has been selected.

As shown in an upper portion of FIGS. 11A and 11B, previews are depicted with respect to the two bending axis of a camera based application.

A lower portion of the FIG. 11A corresponds to an activation of the bending axis with respect to the preview shown in the upper portion of the FIG. 11A, such that the user is now presented the option to click anywhere within the right hand side portion as shown and gather the information. In an example depicted in FIG. 11A, Himalayan hills is shown at the right hand side in the lower portion of FIG. 11A has been clicked. Accordingly, a message asking the user to bend the computing device about the currently active bending-axis emerges at the left hand side portion. As a result, the application of pressure about the selected bend axis leads to obtaining web-based information about Himalayas.

A lower portion of FIG. 11B corresponds to an activation of the bending-axis with respect to the preview shown in the upper portion of FIG. 11B, such that the user is now presented with the option at the left hand side to adjust brightness of the image shown at the right hand side. Accordingly, the user's application of pressure is directed against such brightness-control option, thereby bending the computing-device about the currently active bending-axis and increasing the brightness. Likewise, a bending in an opposite direction about the currently active bending axis leads to a decrement in the brightness.

FIGS. 12A and 12B are views illustrating another implementation of an embodiment in which 'digital maps' based application has been selected.

As shown in upper portions of FIGS. 12A and 12B, previews have been depicted with different active bending axis in the 'maps' based application.

A lower portion of FIG. 12A corresponds to an activation of the bending axis with respect to the preview shown in the upper portion of the FIG. 12A, such that the user is now presented with the control options 1202 at the right hand side to seek information about the map depicted in the left hand side portion. The user may select one of the options 1202, for example, to locate emergency services within the map.

As depicted in a lower portion of FIG. 12B, selection of the 'emergency services' option allows the user to locate hospitals, trauma centers, etc. within the map. At such juncture, the user may apply pressure against the map to bend the right hand side portion, for the purpose of zooming in and out of the map and locating far and near emergency service. Application of pressure against the map at the right hand side may be performed in opposite circular directions (i.e. clockwise or anticlockwise) for the purpose of zooming in and out. Likewise, for the purpose of ultra-zooming in order to located services in the nearest radii, increases levels/intensities of pressures may be applied.

Figure 13:
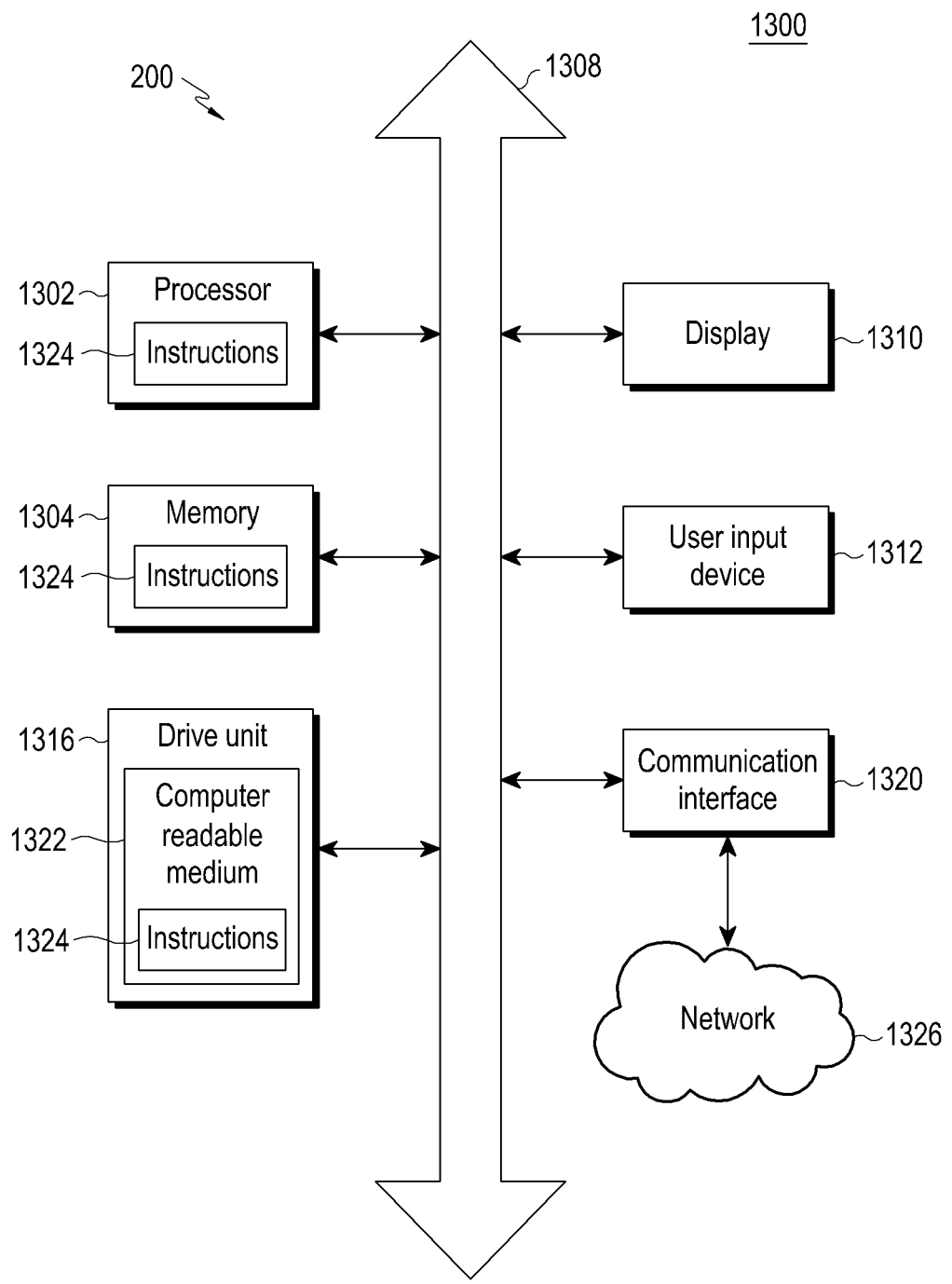
FIG. 13 is a block diagram illustrating a computing-device according to an embodiment.

FIG. 13 is a block diagram illustrating yet another implementation according to an embodiment in which a hardware configuration of a system such as the system 200, in the form of a computer system 1300 is shown. The computer system 1300 can include a set of instructions that can be executed to cause the computer system 1300 to perform any one or more of the methods disclosed above according to embodiments. The computer system 1300 may operate as a stand-alone device or may be connected, e.g., using a network, to other computer systems or peripheral devices.

In a networked deployment, the computer system 1300 may operate in the capacity of a server or as a client user computer in a server-client user network environment, or as a peer computer system in a peer-to-peer (or distributed) network environment. The computer system 1300 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone having a touch-screen user interface, e, or any other machine capable of executing a set of instructions (sequential or otherwise) that specify actions to be taken by that machine. In an embodiment, the computer system 200, may be a mobile computing device capable of being worn by a user, e.g. a smartwatch, an augmented-reality headgear, a wearable mobile-phone etc. Further, while a single computer system 1300 is illustrated, the term "system" shall also be taken to include any collection of systems or sub-systems that individually or jointly execute a set, or multiple-sets, of instructions to perform one or more computer functions.

The computer system 1300 may include a processor 1302 e.g., a central processing unit (CPU), a graphics processing unit (GPU), or both. The processor 1302 may be a component in a variety of systems. For example, the processor 1302 may be part of a standard personal computer or a workstation. The processor 1302 may be one or more general processors, digital signal processors, application specific integrated circuits, field programmable gate arrays, servers, networks, digital circuits, analog circuits, combinations thereof, or other now known or later developed devices for analyzing and processing data. The processor 1302 may implement a software program, such as code generated manually (i.e., programmed).

The computer system 1300 may include a memory 1304, such as a memory 1304 that can communicate via a bus 1308. The memory 1304 may include, but is not limited to, a computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1304 includes a cache or a random access memory for the processor 1302. In alternative examples, the memory 1304 is separate from the processor 1302, such as a cache memory of a processor, the system memory, or other memory. The memory 1304 may be an external storage device or database for storing data. The memory 1304 is operable to store instructions executable by the processor 1302. The functions, acts, or tasks illustrated in the figures or described may be performed by the programmed processor 1302 executing the instructions stored in the memory 1304. The functions, acts, or tasks are independent of the particular type of instructions set, storage media, processor or processing strategy and may be performed by software, hardware, integrated circuits, firmware, micro-code and the like, operating alone or in combination. Likewise, the processing strategies may include multiprocessing, multitasking, parallel processing, and the like.

As shown, the computer system 1300 may or may not further include a touch-sensitive display 1310, for outputting determined information as well as receiving a user's touch-gesture based inputs, such as drag and drop, single tap, multiple-taps, etc. The display 1310 may act as an interface for the user to see the functioning of the processor 1302, or specifically as an interface with the software stored in the memory 1304 or in the drive unit 1316 such as a driver hardware component.

Additionally, the computer system 1300 may include a user input device 1312 configured to allow a user to interact with any of the components of system 1300. The computer system 1300 may also include a disk or optical drive unit 1316. The disk drive unit 1316 may include a computer-readable medium 1322 in which one or more sets of instructions 1324, e.g. software, can be embedded. Further, the instructions 1324 may embody one or more of the methods or logic as described. In a particular example, the instructions 1324 may reside completely, or at least partially, within the memory 1304 or within the processor 1302 during execution by the computer system 1300.

An embodiment contemplates a computer-readable medium 1322 that includes instructions 1324 or receives and executes instructions 1324 responsive to a propagated signal so that a device connected to a network 1326 can communicate voice, video, audio, images, or any other data over the network 1326. Further, the instructions 1324 may be transmitted or received over the network 1326 via a communication port or interface 1320 or using the bus 1308. The communication port or interface 1320 may be a part of the processor 1302 or may be a separate component. The communication port 1320 may be created in software or may be a physical connection in hardware. The communication port 1320 may be configured to connect with the network 1326, external media, the display 1310, or any other components in the system 1300, or combinations thereof. The connection with the network 1326 may be established wirelessly, as discussed later. Likewise, the additional connections with other components of the system 1300 may be established wirelessly. The network 1326 may alternatively be directly connected to the bus 1308.

The network 1326 may include wireless networks, Ethernet AVB networks, or combinations thereof. The wireless network may be a cellular telephone network, an 802.11, 802.16, 802.20, 802.1 Q or WiMax network. Further, the network 1326 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

The present subject matter aims to amplify the user experience of interacting with the device application functions using the bendable display screen technology. As the display screen can be bent along various angles and multiple-axis, the bend-able positions have been enabled as different virtual modes of the display screen. Embodiments utilize the property of bending of the screen along various axes, and based on the selected axis of bending, customize the selected application functions to cater to a specific user requirement as a standard output to a display screen.

Embodiments focus on providing the user with a choice to control the bending of the display device, thus dynamically selecting a customized output pattern or a layout of the application function as per the requirement. More specifically, embodiments appropriate the controllability of bending of the device about various bend axes. Accordingly, a user is enabled to use the bending property of the display screen to extract a specific customized output from the selected application function. Overall, a particular application is able to exhibit 'polymorphism' based behavior at the same display screen.

While specific language has been used to describe embodiments, any limitations arising on account of the same are not intended. As would be apparent to a person in the art, various working modifications may be made to the method in order to implement an inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The scope of embodiments is by no means limited by these specific examples. Numerous variations, whether explicitly given in the specification or not, such as differences in structure, dimension, and use of material, are possible.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component. The scope of the disclosure would be indicated by the claims, which will be described later, the spirit and scope of the claims and their equivalents, and all such modifications as would be derived from the equivalent concept intended to be included within the scope of the disclosure.

What is claimed is:

1. A method for operating a flexible computing device, the method comprising:
   identifying at least one bending axis associated with an application selected by a user;
   receiving a user input on a display of the flexible computing device to select a bending axis from the identified at least one bending axis; and
   displaying a user interface of the application based on the selected bending axis,
   wherein a number of the at least one bending axis associated with the application is updated when a location of an application icon of the application is changed.

2. The method of claim 1, wherein the identifying the at least one bending axis comprises:
   detecting a hovering input over a first bending axis among the at least one bending axis; and
   providing a preview of a layout corresponding to the first bending axis.

3. The method of claim 1, wherein the user input includes pressure applied on the selected bending axis.

4. The method of claim 1, wherein the at least one bending axis is identified based on at least one of the location of the application icon, a type of the application or preference of the user.

5. The method of claim 1, wherein the displaying the user interface of the application comprises:
   rendering data set of a function of the application mapped to the selected bending axis.

6. The method of claim 1, wherein the user interface includes at least one control option to operate a function mapped to the selected bending axis.

7. The method of claim 1, further comprising:
   receiving a second user input on the display of the flexible computing device;
   identifying at least one of a location or a level of the second user input; and
   providing data access corresponding to the at least one of the location or the level of the second user input.

8. The method of claim 1, wherein a function of the application associated with a remaining one of the at least one bending axis except for the selected bending axis is limited.

9. The method of claim 1, wherein the display is divided into a first area and a second area by the selected bending axis, and the first area provides a first content different from a second content provided in the second area.

10. A flexible computing device, comprising:
    a display; and
    at least one processor configured to:
      identify at least one bending axis associated with an application selected by a user,
      receive a user input on the display to select a bending axis from the identified at least one bending axis, and
      control the display to display a user interface of the application based on the selected bending axis,
    wherein a number of the at least one bending axis associated with the application is updated when a location of an application icon of the application is changed.

11. The flexible computing device of claim 10, wherein the at least one processor further configured to:
    detecting a hovering input over a first bending axis among the at least one bending axis, and
    provide a preview of a layout corresponding to the first bending axis.

12. The flexible computing device of claim 10, wherein the user input includes pressure applied on the selected bending axis.

13. The flexible computing device of claim 10, wherein the at least one bending axis is identified based on at least one of the location of the application icon, a type of the application or preference of the user.

14. The flexible computing device of claim 10, wherein the at least one processor further configured to:
 render data set of a function of the application mapped to the selected bending axis.

15. The flexible computing device of claim 10, wherein the user interface includes at least one control option to operate a function mapped to the selected bending axis.

16. The flexible computing device of claim 10, wherein the at least one processor further configured to:
 receive a second user input on the display,
 identify at least one of a location or a level of the second user input, and
 provide data access corresponding to the at least one of the location or the level of the second user input.

17. The flexible computing device of claim 10, wherein a function of the application associated with a remaining one of the at least one bending axis except for the selected bending axis is limited.

18. The flexible computing device of claim 10, wherein the display is divided into a first area and a second area by the selected bending axis, and the first area provides a first content different from a second content provided in the second area.

* * * * *